US008745587B2

(12) United States Patent
Dhanakshirur et al.

(10) Patent No.: US 8,745,587 B2
(45) Date of Patent: Jun. 3, 2014

(54) SYSTEM AND METHOD FOR TESTING COMPUTER PROGRAMS

(75) Inventors: Girish Dhanakshirur, Delray Beach, FL (US); Rocco F. Palermo, Jr., Boynton Beach, FL (US); Lenora E. Wright, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1623 days.

(21) Appl. No.: 11/866,720

(22) Filed: Oct. 3, 2007

(65) Prior Publication Data

US 2009/0094583 A1    Apr. 9, 2009

(51) Int. Cl.
*G06F 9/44* (2006.01)

(52) U.S. Cl.
USPC .......................................... 717/124; 717/125

(58) Field of Classification Search
USPC .................................................. 717/124–127
See application file for complete search history.

(56) References Cited

U.S. PATENT DOCUMENTS

| 5,651,111 | A  | * | 7/1997 | McKeeman et al. ............. 714/38 |
| 6,505,342 | B1 | * | 1/2003 | Hartmann et al. .............. 717/104 |
| 6,523,169 | B1 | * | 2/2003 | Glunz ............................ 717/124 |
| 7,334,219 | B2 | * | 2/2008 | Cebula et al. .................. 717/124 |
| 7,392,507 | B2 | * | 6/2008 | Kolawa et al. ................. 717/124 |
| 7,587,636 | B2 | * | 9/2009 | Tillmann et al. ................ 714/33 |
| 7,681,180 | B2 | * | 3/2010 | de Halleux et al. ............ 717/124 |
| 7,797,687 | B2 | * | 9/2010 | Tillmann et al. ............... 717/131 |
| 2004/0133880 | A1 | * | 7/2004 | Paternostro et al. ........... 717/124 |
| 2007/0033576 | A1 | * | 2/2007 | Tillmann et al. ............... 717/124 |
| 2008/0115116 | A1 | * | 5/2008 | Francis et al. ................. 717/135 |

* cited by examiner

*Primary Examiner* — Anna Deng
(74) *Attorney, Agent, or Firm* — Novak Druce Connolly Bove + Quigg LLP (57) ABSTRACT

A method for testing computer programs includes the steps of identifying at least one code subsection of a computer program to be tested, ascertaining one or more other code subsections required for executing the identified subsection, determining one or more input arguments required for executing the identified subsection and the other subsections, prompting a developer to provide at least one of the input arguments, and executing the identified subsection using the provided input arguments.

20 Claims, 4 Drawing Sheets

SYSTEM AND METHOD FOR TESTING COMPUTER PROGRAMS

FIELD OF THE INVENTION

This invention is related to the field of computer program testing, and more particularly, to systems and methods for testing computer programs.

BACKGROUND OF THE INVENTION

In general, computer programming environments require developers to rigorously test and debug new computer programs prior to entering any type of formal testing phase. Although tools are currently available for assisting developers in testing new programs, such tools typically require a substantial amount of a developer's time to configure the tools for testing even the smallest portion of a new program. The additional time expended to configure a testing tool not only can increase the cost of developing a computer program, but can also reduce the amount of time developers are able to spend modifying and improving the computer program prior to its release.

SUMMARY OF THE INVENTION

In a first embodiment of the invention, a method for testing computer programs can include the steps of identifying at least one code subsection of a computer program to be tested, ascertaining one or more other code subsections required for executing the identified subsection, determining one or more input arguments required for executing the identified subsection and the other subsections, prompting a developer to provide at least one of the input arguments, and executing the identified subsection using the provided input arguments.

In a second embodiment of the invention, a system for testing computer programs can include a memory element operable to store one or more code subsections of a computer program and at least one developer interface element operable to allow a developer to identify at least one code of the code subsection of the computer program to be tested. The system can further include a processing element operable to ascertain one or more other code subsections required for executing the identified subsection, to determine one or more input arguments required for executing the identified subsection and the other subsections, to prompt a developer to provide at least one of the input arguments via the developer interface, and to execute the identified subsection using the provided input arguments.

In a third embodiment of the invention, a computer-readable storage medium having stored thereon a computer program having a plurality of code sections for testing computer programs, can include code sections executable by a computer for causing the computer to perform the steps of identifying at least one code subsection of a computer program to be tested, ascertaining one or more other code subsections required for executing the identified subsection, determining one or more input arguments required for executing the identified subsection and the other subsections, prompting a developer to provide at least one of the input arguments, and executing the identified subsection using the provided input arguments.

This Summary is provided to comply with 37 C.F.R. §1.73, requiring a summary of the invention briefly indicating the nature and substance of the invention. It is submitted with the understanding that it will not be used to interpret or limit the scope or meaning of the claims.

DETAILED DESCRIPTION OF THE DRAWINGS

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known devices or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

As previously described, various tools are available to developers for testing and debugging computer programs during the development phase. One method is to use an "off the shelf" tool and adapt it for testing of the computer program being developed. However, because such tools are typically designed for general use, they usually require that developers spend a significant amount of time modifying or configuring such tools in order to test the computer program being developed. Another method is to develop a testing tool specifically designed to test the computer program being developed. However, such a method typically requires significant development time and resources. In some case, the development of such tools can require more time and resources than were necessary for the development of the computer program it was designed to test.

In the embodiments of the invention, systems and methods for generating testing scenarios for specific computer programs using intelligent methods and for performing testing of the computer program are provided. In particular, the embodiments of the present invention provide for testing of computer programs by introspection of the computer program; that is, intelligently interrogating one or more identified code sections of the computer program, and dynamically generating developer interfaces to prompt developers for any input information required for executing the identified code sections. Additionally, embodiments of the present invention can also identify other code sections (as well as any necessary input information for these sections) required for testing the identified code section. In some embodiments of the present invention, "stub" or stand-in replacement code sections can be provided where the needed code sections are inaccessible or otherwise unavailable during testing.

Although various exemplary embodiments of the present invention may be described in terms of specific programming languages or programming environments, such description are intended only for the purpose of illustration. One of ordinary skill in the art will readily recognize that the invention is not limited in this regard and that inventive aspects of the invention can be applied for use in the context of any type of programming language or development environment.

Figure 1:
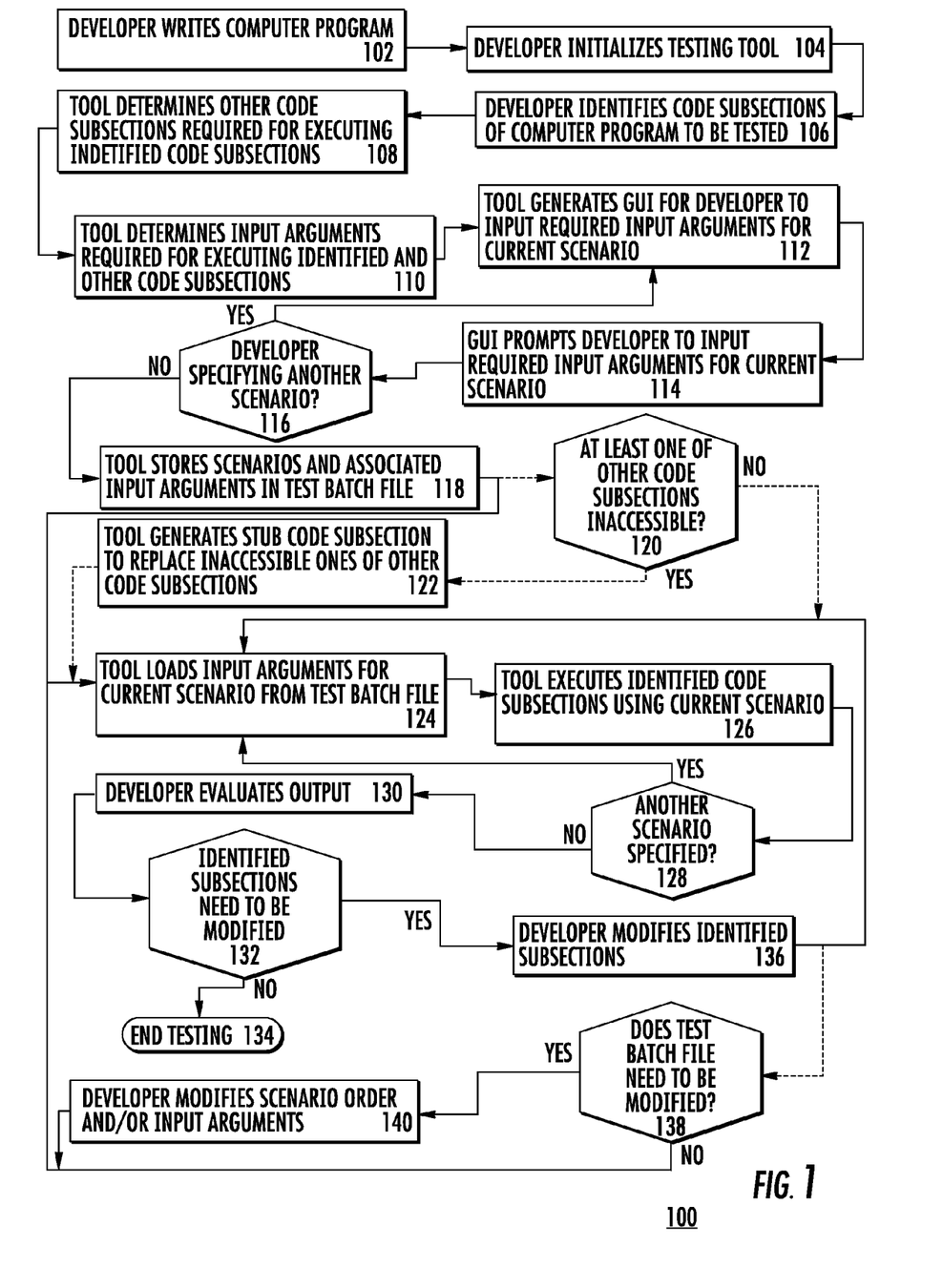
FIG. 1 is a flowchart of exemplary steps of a method for testing computer programs according to an embodiment of the present invention.

FIG. 1 is a flowchart illustrating steps in an exemplary method 100 for testing computer programs. First, as shown in Step 102, a developer or developers can write a computer program to a mass storage device. In the various embodiments, the developer can write the computer program using local or remote resources. Thus, the developer can write and store the computer program using only a local device or can access a remote device via a client terminal operating over a network. However, the invention is not limited in this regard, and one of ordinary skill in the art can appreciate that in some embodiments a developer can write and store the computer programs using a combination of local and remote resources. Details on the operation of such remote and local devices are described more particularly below.

A computer program, as used herein, can be any collection of instructions that describes a task, or set of tasks, to be carried out by a computer. As such, a computer program, as described herein, can refer to any collection of instructions, including a subsection of a larger computer program. Furthermore, these computer programs can be described as an expression of a computational method written in a computer language and can be categorized along functional lines. These functional categories include application software, operating systems, video games, and compilers, among others. The computer program can also embedded in hardware devices typically referred to as firmware. Additionally, computer programs, as used herein, can refer to either the formal expression of computational methods in a human-readable computer language, often referred to as source code, or the machine-executable expressions of computational methods commonly referred to as executables, object code, or simply as binaries—a reference to the binary file format commonly used to store executable code.

Referring still to FIG. 1, after writing the computer program in Step 102, the developer can begin the testing process. For example, as shown in Step 104, the developer can initialize a testing tool. Methods for selecting and initializing computer programs are well-known in the art. The testing tool, as described herein, can also be a computer program or a computer system executing instructions embodying the method 100. The testing tool can also be included as part of an operating system or development environment. However, the testing tool can also be a separate computer program, accessed locally or remotely, depending on the configuration being used by the developer. Therefore, the testing tool design and implementation can be affected by the complexity of the testing that needs to be done, the experience of the developer or developers, and the computing resources available. A testing tool for a relatively simple computer program can be a single, monolithic, separate computer program. However, if the computer program or the computer language being used is large and complex, and if high quality output is required, the testing tool design may require that tasks be split into a number of relatively independent phases or passes. Therefore, as one of ordinary skill in the art will recognize, the testing tool can be deployed and operated using either local resources, remote resources, or any combination thereof.

Once the testing tool is initialized in Step 104, the developer can then identify code subsections of the computer program to be tested in Step 106. Such code subsections can be identified by providing their location in memory. Additionally, the code subsections can also be named by the developer and the name can be used by the tool for identification purposes. In some embodiments, a combination of names and locations can be used to identify specific subsections within a computer program. In either case, the code sections can be identified by entering identification or location information via a developer interface. In one embodiment, illustrated in FIG. 2, a graphical developer interface (GUI) 200 for Java classes can be provided that includes a developer input section 202 for entering a location and class name of the Java class to be tested. However, the present invention is not limited to using the configuration of GUI 200, and other arrangements and methods, such as using "wizards," an alternate GUI configuration, or command line interface, are equally applicable to the present invention. The GUI is also not limited to selection of Java classes and can also be configured to select any type or combination of program fragments. By example and not by way of limitation, for a given system, the GUI can be configured to allow the developer to select between existing APIs (java/class), WSDLs, IDLs. XMLs, VXMLs, or any combination thereof.

As previously described, a computer program to be tested can comprise any set or subset of computer instructions. Therefore, a developer can choose to test only one or more subsections of the computer program. Therefore, the developer is able to limit testing to only those features the developer is currently developing or modifying. For example, a Java class may be used to define the operation of a GUI in a larger program. Therefore, rather than testing the entire computer program to simply test the operation of the GUI Java class, the developer can choose only to test the GUI Java class, without requiring testing of other Java classes or using significant resources of the complete system. Such a configuration is advantageous in computer programs operating in large complex systems, as the portion being developed can be tested without having to disrupt use of the complete system. However, the invention is not limited in this regard, and one of ordinary skill in the art can appreciate that the developer can also identify multiple code sections or even an entire computer program for testing.

Referring back to FIG. 1, after the code sections to be tested are identified in Step 106, the tool, in Step 108 can begin to analyze the identified code sections. First, in Step 108, the tool can determine other code subsections that may be necessary for testing the identified code subsection. That is, identified code subsections may be relying on other code subsections for functionality or input variables. The other code subsections can be a part of the same computer program as the identified code subsections. However, in some embodiments the other code subsection can be parts of separate computer programs. For example, a Java class can make several calls to various public or private methods. Therefore, although the code subsections defining the operation of the methods are not included in the Java class, the tool can also retrieve the code subsections of the methods or at least determine where the code sections are located.

Once the tool has determined all of the code subsections that are needed for testing the identified code subsection in Step 108, the tool, in Step 110, can then determine what type of input information is needed from the developer so as to properly test the identified subsections. That is, the tool can determine the input arguments needed for execution of the identified subsections, as well as any input arguments required by any other identified subsections. The input arguments can be values or locations of values that would normally be passed to a computer program. Such values can include any type of data or any portion of a data structure containing data to be used by the code subsections. For example, a Java class may be implemented to manipulate a set of data. Also, any methods being called by the Java class being tested can require input arguments that may be passed to the Java class, but that may not be used by the class until a method is called. Therefore, the input arguments can include the location or values for the data to be manipulated by the class or by any of the methods within the class.

Figure 3:
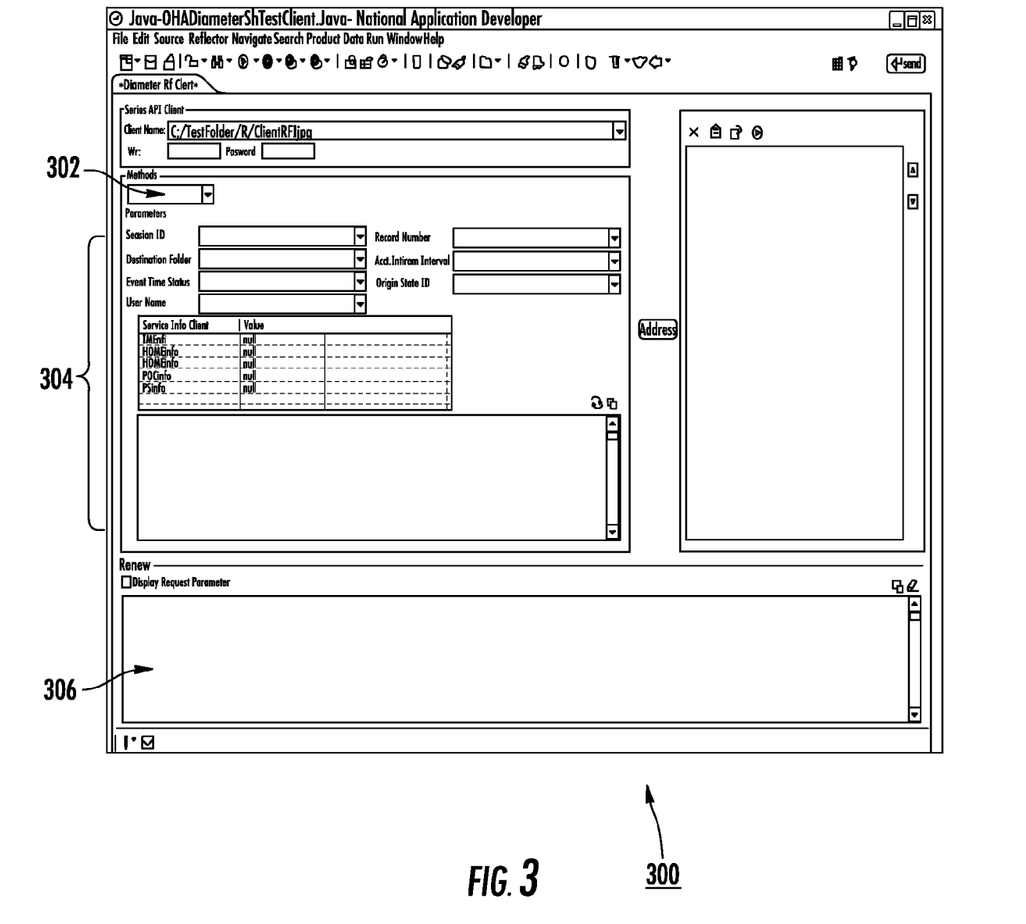
FIG. 3 is a schematic view of an exemplary GUI for providing input arguments for a computer program to be tested according to an embodiment of the present invention.

After the tool determines the required input arguments in Step 110, the tool can generate an interface for the developer to provide the input arguments in Step 112. The tool, via the interface, can then query the developer in Step 114 so as to provide the various input arguments required for successful execution of the identified code sections. For example, as shown in FIG. 3, a GUI 300 can be provided to allow a developer to input the various input parameters. In FIG. 3, the GUI 300 include a method drop down box 302 configured to allow the developer to select a method in the Java class being tested and additional input fields 304 for entering the necessary input. However, the present invention is not limited to using a GUI, and other methods, such as using a command line interface, are equally applicable to the present invention.

In some embodiments, it can be necessary to test the code sections under multiple testing scenarios in order to rigorously test the code sections. Therefore, in some embodiments of the present invention, the tool can provide functionality to allow the developer to provide multiple sets of the input arguments and to associate there sets of input arguments with one or more scenarios. Accordingly, after the developer specifies a set of input arguments, the tool can query the developer, in Step 116, as to whether another scenario should be specified. If other scenarios are to be specified, Steps 112-116 can be repeated until the developer provides input arguments for all the scenarios to be specified. Various methods for specifying and storing multiple input arguments are well-known in the art. Once the developer indicates that no other scenarios are needed in Step 116, the tool, in Step 118, can store the multiple scenarios, including the associated input arguments in a test batch file. Various methods for specifying and storing batch and/or data files are well-known in the art.

Typically, a computer program can male calls to one or more other computer programs. However, during development of a computer program, some portions of the computer program may be incomplete or unavailable to the developer, even though they are necessary for execution of the identified code subsections. For example, a tool can have an interface to a remote server and not the underlying code to execute the remote call on a remote server providing some type of function during development.

Therefore, in embodiments of the present invention, the tool can generate substitute code or "stubs" that can stand in place of the missing code sections. For example, the tool, in Step 120, can determine if one of the other code sections required is currently unavailable or otherwise inaccessible to the testing tool. If such code sections are inaccessible, the tool can generate the necessary stubs in Step 122 so that values can be passed between the identified code and the stubs to allow proper testing of the identified code sections. For instance, the stub can be configured to simulate the expected behavior of unavailable resources, such as a remote server performing one or more processes or procedures. In some cases, the stub information can also be incorporated into the test batch file contents. Although the creation of stubs illustratively precedes execution of the identified code sections, one of ordinary skill in the art can appreciate that stubs can also be created dynamically during execution of the identified code sections or can be created as the tool analyzes the code sections in Step 108.

Once all input arguments are provided, the tool, in Step 124, can load into active memory the input arguments necessary for executing the identified code sections (and any other code sections). Subsequently, the identified code sections can be executed in Step 126. Upon execution of the identified code sections in Step 126, the tool can determine, in Step 128, if other scenarios have been specified by the developer and repeat Steps 124-128 until all scenarios have been used to execute the identified code sections. The output for each scenario can be presented to the developer for evaluation in Step 130. For example, as shown in FIG. 3, an output region 306 of the GUI 300 can be used to display an output of identified code section. However, the present invention is not limited in this regard and other known methods of presenting or storing output information for use by developers are equally applicable to the present invention.

Referring back to FIG. 1, if evaluation of the output by the developer indicates that the identified code sections do not need to be modified (that is, they are operating properly) in Step 132, then testing is ended in Step 134. However, if the output is not correct in view of the developer, the developer can modify the identified subsections in Step 136 and resubmit the subsections for testing.

Although the testing can proceed by repeating Steps 102-134, in some embodiments, the identified subsections need not be reanalyzed to determine the necessary input arguments, especially if the changes have not resulted in any changes in necessary input arguments. Instead, the test batch file created in step 118 can be used to skip analysis steps 106-122, and the testing of the identified subsections can proceed directly to step 124 for additional testing.

In some embodiments, whether the identified code sections are to be reanalyzed can be specified by the developer upon resubmission. In other embodiments, the determination can be made by the tool itself. In such embodiments, the tool can be configured to analyze the modified portions of the identified code sections and determine if the necessary input arguments are different from those stored in the test batch file. If changes are found, the developer can be prompted to provide at least the new input arguments. In some cases, the tool can be configured to require the developer to provide all input arguments anew. However, if no changes in input arguments are found, the tool can then begin retesting the identified code sections in Step 124. Such a configuration allows the testing to be completed even more quickly and is advantageous in cases where the modifications to the identified code sections are minor.

However, even if changes in the identified subsections are minor, changes in the input arguments can still be necessary. For example, the developer may wish to consider additional scenarios or may need to test specific types of input arguments. Therefore, in some embodiments of the present invention, the tool can provide for modification of the test batch file. In some cases, the developer can select to make the changes manually. In other cases, if the test tool can query the developer in Step 138 if the developer wishes to make changes to the test batch file in response to any modifications in the identified subsections. In other cases, the developer can change the order of execution in the test batch file.

Accordingly, if changes are needed, the developer, in Step 140, can modify the scenarios or input arguments in the test batch file, and testing can begin again in Step 124. However, the tool can also be configured to allow modification of the test batch file even if no changes were made to the identified code subsections. For example, a developer may wish to consider an additional scenario or additional ranges of input arguments. In such embodiments, the tool can be configured to provide a prompt to a developer as to whether additional testing using a modified test batch file is desired. Accordingly, whether modifications to the identified subsections or the test batch file are made, Steps 124-140 can be repeated as necessary until the developer is satisfied with the output of the identified subsections.

Figure 2:
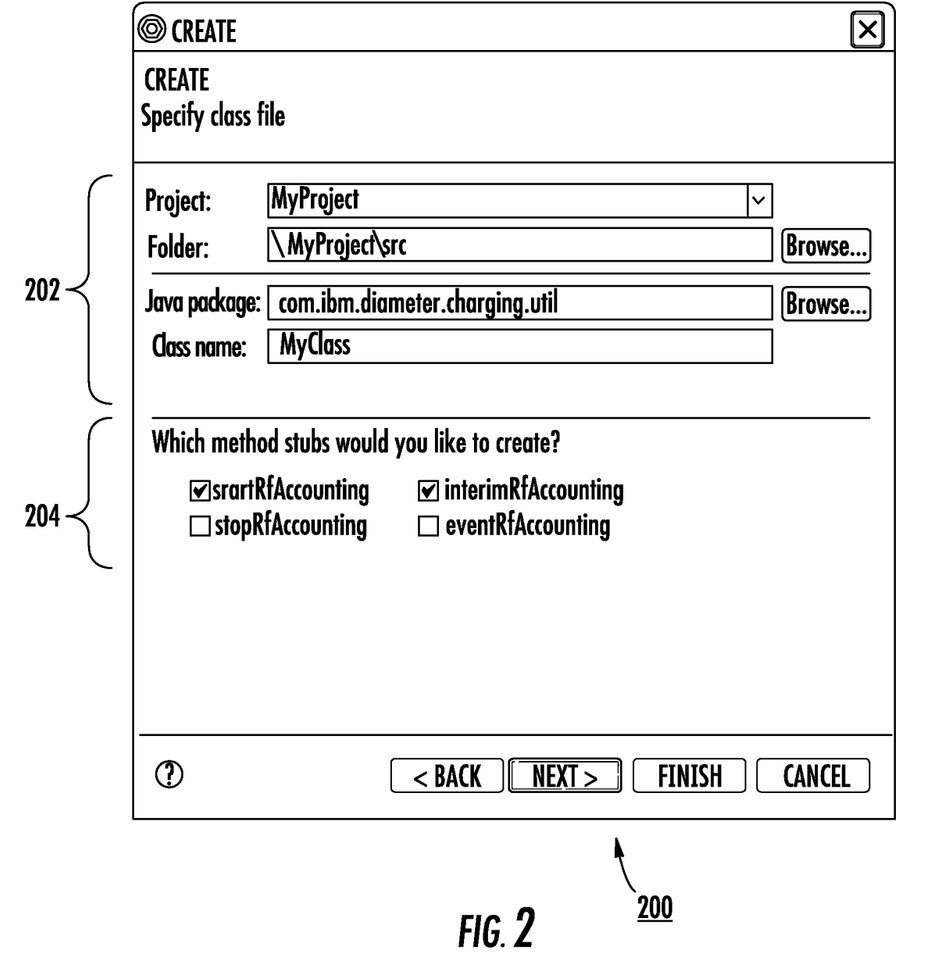
FIG. 2 is a schematic view of an exemplary Graphical User Interface (GUI) for selecting a computer program to be tested according to an embodiment of the present invention.

Other modifications to the invention as described above are within the scope of the claimed invention. For example, the test batch file not only can test scenarios separately, but also can be used to test a specific sequence of scenarios. Thus any subsequent modifications of the scenarios can also include reordering the execution order of the various scenarios being tested. In another example, the stubs need not be generated for each identified code section. Instead, the developer can be provided the option of specifying the locations of already generated stubs, simulators, or alternate remote systems providing the necessary functionality. For example, such information can be provided while providing input arguments. Alternatively, during selection of the code sections to be tested, the developer can also be provided with the opportunity to identify or to instruct the tool to generate any needed stubs, as shown by the selection boxes 204 in exemplary GUI 200. In yet another embodiment, the test batch file can be stored for later use. Such a configuration allows for testing of the identified code sections at a later time, permitting the developer to retest the identified code section if modifications are made at a later date or if it is believed that changes in other code sections have affected the identified code sections.

Figure 4:
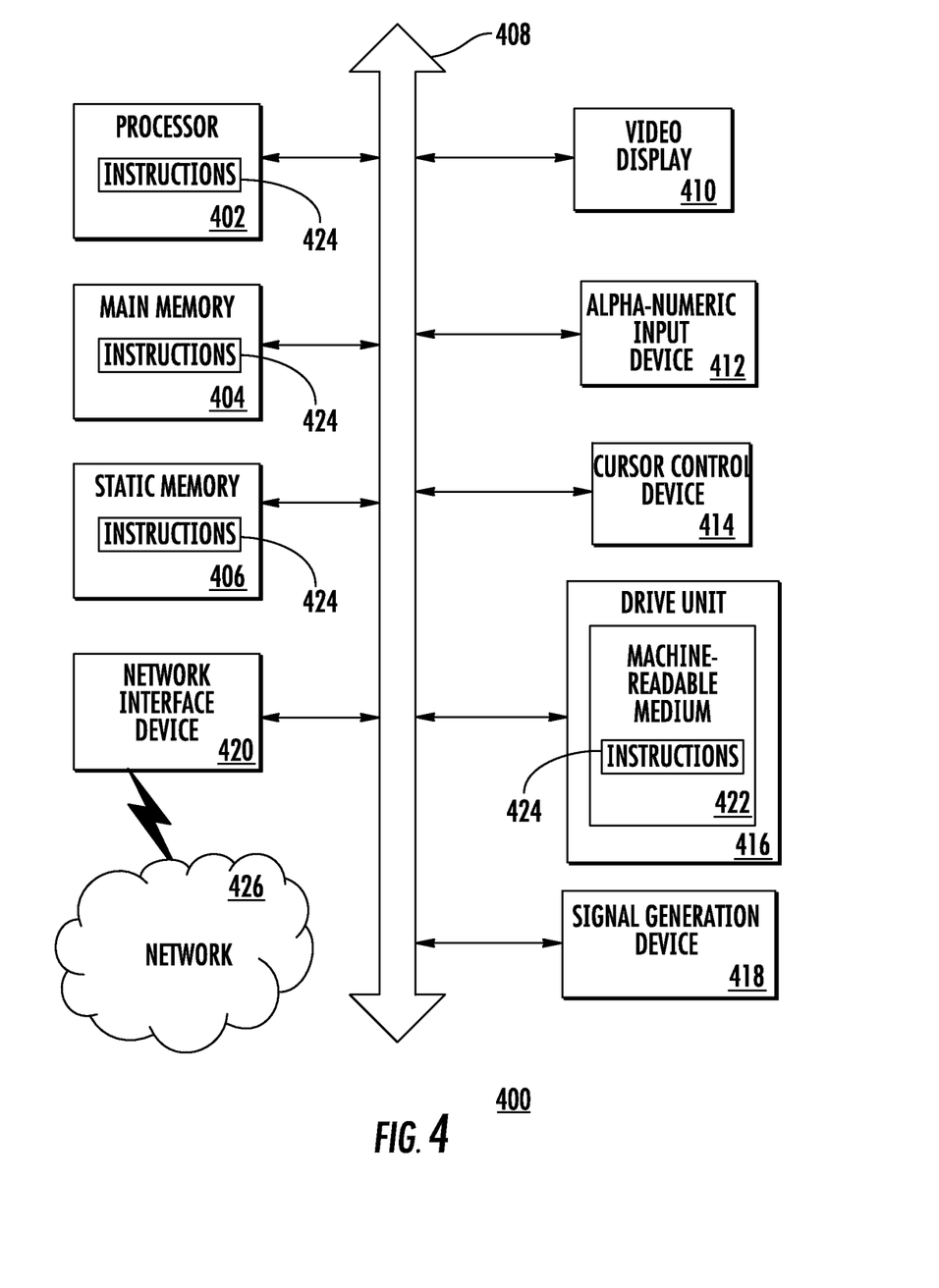
FIG. 4 is a schematic view of a computer system within which a set of instructions operate according to an embodiment of the invention.

FIG. 4 is a schematic diagram of a computer system 400 for executing a set of instructions that, when executed, can cause the computer system to perform one or more of the methodologies and procedures described above. In some embodiments, the computer system 400 operates as a standalone device. In other embodiments, the computer system 400 can be connected (for example, using a network) to other computing devices. In a networked deployment, the computer system 400 can operate in the capacity of a server or a client developer machine in server-client developer network environment, or as a peer machine in a peer-to-peer (or distributed) network environment.

The machine can comprise various types of computing systems and devices, including a server computer, a client developer computer, a personal computer (PC), a tablet PC, a laptop computer, a desktop computer, a control system, a network router, switch or bridge, or any other device capable of executing a set of instructions (sequential or otherwise) that specify actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 400 can include a processor 402 (such as a central processing unit (CPU), a graphics processing unit (GPU, or both), a main memory 404 and a static memory 406, which communicate with each other via a bus 408. The computer system 400 can further include a display unit 410 such as a video display (e.g., a liquid crystal display or LCD), a flat panel, a solid state display, or a cathode ray tube (CRT)). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a computer-readable storage medium 422 on which is stored one or more sets of instructions 424 (for example, software code) configured to implement one or more of the methodologies, procedures, or functions described herein, including those methods illustrated above. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 424 or that receives and executes instructions 424 from a propagated signal so that a device connected to a network environment 426 can send or receive voice and/or video data, and that can communicate over the network 426 using the instructions 424. The instructions 424 can further be transmitted or received over a network 426 via the network interface device 420.

While the computer-readable storage medium 422 is shown in an exemplary embodiment to be a single storage medium, the term "computer-readable storage medium" should be taken to include a single medium or multiple media (for example, a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for testing computer programs, the method comprising:
    identifying at least one code subsection of a computer program to be tested to yield an identified subsection;
    generating, via a processor, a test batch file for testing the identified subsection, the generating comprising:
        ascertaining one or more other code subsections required for executing a current version of the identified subsection;
        determining one or more input arguments required for executing the identified subsection and the other subsections to yield required arguments for the test batch file;
        retrieving previous input arguments available for a previous version of the identified code subsection and the other subsections;
        analyzing the previous input arguments with respect to the required arguments to identify which of the required arguments cannot be provided by the previous input arguments due to no corresponding one of the previous input arguments or a corresponding one of the previous input arguments being at least one of invalid for the current version of the identified subsection or invalid for the other subsections;
        for any of the required arguments that cannot be provided by the previous input arguments, prompting a developer to provide the one of the required arguments; and
        for any of the required arguments that can be provided by the previous input arguments, using the corresponding one of the previous input arguments; and
    executing the current version of the identified subsection using the test batch file.

2. The method of claim 1, wherein the provided input arguments are associated with one or more scenarios for executing the identified subsection, and wherein the step of executing further comprises executing the identified subsection according to each of the scenarios.

3. The method of claim 2, the test batch file comprising a listing of the scenarios and the provided input arguments associated with the scenarios.

4. The method of claim 3, further comprising the steps of:
    retrieving the test batch file; and
    repeating the step of executing using the scenarios in the test batch file.

5. The method of claim 3, further comprising the step of modifying the test batch file to adjust at least one among the provided input arguments, an execution order for the scenarios, and a number of the scenarios.

6. The method of claim 1, wherein the executing step further comprises:
    determining inaccessible ones of the other code subsections;
    generating stub code subsections for the inaccessible code subsections; and
    executing the stub code subsections in place of the inaccessible code subsections.

7. The method of claim 1, wherein at least a portion of the executing step is performed using a simulated code subsection.

8. A system for testing computer programs comprising:
    a memory element operable to store one or more code subsections of a computer program, at least one developer interface element operable to allow a developer to identify at least one of the code subsections of the computer program to be tested to yield an identified subsection; and a processing element operating without user intervention and configured to generate a test batch file for testing the identified subsection and execute the identified subsection using the test batch file, the generating comprising:

ascertaining one or more other code subsections required for executing the identified subsection, determining one or more input arguments required for executing the identified subsection and the other subsections to yield required arguments for the test batch file, retrieving previous input arguments available for the identified code subsection and the other subsections, analyzing the previous input arguments with respect to the required arguments to identify which of the required arguments cannot be provided by the previous input arguments due to no corresponding one of the previous input arguments or a corresponding one of the previous input arguments being at least one of invalid for a current version of the identified subsection or invalid for the other subsections, or unavailable, prompting a developer to provide at least one of the input arguments via the developer interface, else using the previous input arguments to provide the input arguments, for any of the required arguments that cannot be provided by the previous input arguments, prompting a developer to provide the one of the required arguments; and for any of the required arguments that can be provided by the previous input arguments, using the corresponding one of the previous input arguments.

9. The system of claim 8, wherein the provided input arguments are associated with one or more scenarios for executing the identified subsection, and wherein the processing element is further configured to execute the identified subsection using the input arguments associated with each of the scenarios.

10. The system of claim 9, the test batch file comprising a listing of the scenarios and the provided input arguments associated with the scenarios.

11. The system of claim 10, wherein the processing element is further configured to:
retrieve the test batch file; and
repeat the step of executing.

12. The system of claim 11, wherein the interface element is further configured to allow a developer to alter the test batch file to adjust at least one among the provided input arguments, an execution order for the scenarios, and a number of the scenarios.

13. The system of claim 8, wherein the processing element is further configured to:
determine inaccessible ones of the other code subsections;
generate stub code subsections for the inaccessible code subsections; and
execute the identified subsection using the stub code subsections in place of the inaccessible code subsections.

14. A non-transitory computer-readable storage medium having stored thereon, a computer program having a plurality of code sections for testing computer programs, the code sections executable by a computer for causing the computer to perform the steps of:
identifying at least one code subsection of a computer program to be tested;

generating, via a processor, a test batch file for testing the identified subsection, the generating comprising:
ascertaining one or more other code subsections required for executing a current version of the identified subsection;
determining one or more input arguments required for executing the identified subsection and the other subsections to yield required arguments for the test batch file;
retrieving previous input arguments available for a previous version of the identified code subsection and the other subsections;
analyzing the previous input arguments with respect to the required arguments to identify which of the required arguments cannot be provided by the previous input arguments due to no corresponding one of the previous input arguments or a corresponding one of the previous input arguments being at least one of invalid for the current version of the identified subsection or invalid for the other subsections;
for any of the required arguments that cannot be provided by the previous input arguments, prompting a developer to provide the one of the required arguments; and
for any of the required arguments that can be provided by the previous input arguments, using the corresponding one of the previous input arguments; and
executing the current version of the identified subsection using the test batch file.

15. The non-transitory computer-readable storage medium of claim 14, further comprising code sections for associating the provided input arguments with one or more scenarios for executing the identified subsection according to developer input, and wherein the code sections for the executing step further comprise code sections for executing the identified subsection according to each of the scenarios.

16. The non-transitory computer-readable storage medium of claim 15, the test batch file comprising a listing of the scenarios and the provided input arguments associated with the scenarios.

17. The non-transitory computer-readable storage medium of claim 16, further comprising code sections for:
retrieving the test batch file; and
repeating the step of executing using the scenarios in the test batch file.

18. The non-transitory computer-readable storage medium of claim 16, further comprising code sections for modifying the test batch file, the modifying comprising altering the test batch file to adjust at least one among the provided input arguments, an execution order for the scenarios, and a number of the scenarios.

19. The non-transitory computer-readable storage medium of claim 14, wherein the executing step further code sections for:
determining inaccessible ones of the other code subsections;
generating stub code subsections for the inaccessible code subsections; and
executing the stub code subsections in place of the inaccessible code subsections.

20. The non-transitory computer-readable storage medium of claim 14, wherein the code section for the executing step further comprise code sections for performing at least a portion of the executing step in a simulated operating environment.

* * * * *